United States Patent [19]

Lai

[11] Patent Number: 4,909,656
[45] Date of Patent: Mar. 20, 1990

[54] BRAKE PIVOT

[76] Inventor: Chung-Tan Lai, No. 37, Alley 53, E. Lane 117, Sec. 1, T'ou-Chang Rd., T'an-Tzu Hsiang, Taichung Hsien, Taiwan

[21] Appl. No.: 350,224

[22] Filed: May 11, 1989

[51] Int. Cl.[4] .............................................. B25G 3/34
[52] U.S. Cl. ..................................... 403/271; 403/360; 403/24
[58] Field of Search ............... 403/261, 360, 345, 371, 403/272, 333, 260, 256, 273, 24, 271; 74/567

[56] References Cited

U.S. PATENT DOCUMENTS 4,231,671 11/1980 Makius, Jr. .................... 403/273 X
4,763,614 8/1988 Aragona ........................... 74/567 X Primary Examiner—Kundrat Andrew V.
Attorney, Agent, or Firm—Antonelli, Terry & Wands

[57] ABSTRACT

This invention provides a pivot for a cantilever brake of a mountain bicycle. The pivot is composed of a terraced pipe body and a separately formed lobe plate, which substitute for the integral structure of a conventional brake pivot in order to prevent the lobe plate from being torn by the pulling force of the brake spring.

2 Claims, 3 Drawing Sheets

BRAKE PIVOT

BACKGROUND OF THE INVENTION

The present invention relates to a brake pivot, more particularly to a pivot for a cantilever brake of a mountain bicycle.

Referring to FIGS. 1(A)–1(D), a conventional pivot for a cantilever brake of a mountain bicycle is usually integrally forged from a circular metal rod, as shown in FIG. 1(A), to form a terraced pipe body successively having a large end portion 1, a flange portion 2 the diameter of which is far larger than said large end portion, a middle portion 3 and a small end portion 4, as shown in FIG. 1(B). A portion 21 of said flange portion 2 is commonly then cut down to form a lobe 22 protruding from the position between said large end portion 1 and said middle portion 3, as shown in FIG. 1(C), and an eye 23 is opened in said lobe 22, as shown in FIG. 1(D).

Said pivot is usually affixed in a fork of a bicycle at the end of said large end portion 1, rotatably supporting a cantilever on said small end portion while being resisted by a spring disposed around said mid portion. One end of said spring is attached at said eye 23 and the other end thereof is extended to engage with said cantilever. In addition, one end of said cantilever is usually connected with a brake wire and the other end of the same supports a brake shoe, so that said cantilever can be restorably rotated, depressing said brake shoe to make contact with a rim installed in the fork to brake the bicycle.

The conventional brake pivot has the following drawbacks:

The first being that, the process for forging the flange portion with the diameter which is far larger than said large end portion will generate internal stress and cracks within the pivot material, causing the transition section between said lobe 22 and said terraced pipe body to become brittle and fragile and therefore prone to tearing.

The second being that, the above-mentioned forging process is too complicated, and therefore too expensive to manufacture.

The third being that, cutting down the portion 21 from said flange portion 2 causes a waste of material.

SUMMARY OF THE INVENTION

Therefore, the object of the present invention is to provide a pivot for a cantilever brake, which is simple to manufacture and the lobe of which is strong and durable.

Accordingly, the present invention generally provides a pivot for a cantilever brake, usually affixed in a fork of a bicycle which combines with a spring to pivotally and elastically support a cantilever, one end of which is connected with a brake wire and the other end of which supports a brake shoe, so that said cantilever can be restorably rotated to depress said brake shoe to make contact with the rim installed in the fork, while said brake wire is pulled to brake the bicycle. Said pivot comprises: a terraced pipe body successively and integrally having a large end portion, a middle portion and a small end portion; and a separately formed lobe plate having a throughhole and at least one eye formed beside said throughhole, said lobe plate being tightly coupled on said middle portion of said terraced pipe body by means of said throughhole; whereby said cantilever can be rotatably supported on said small end portion while being resisted by said spring disposed around said mid portion, and one end of thereof can be fixed at said eye of said lobe plate while the other end thereof is extended to engage with said cantilever.

BRIEF DESCRIPTION OF THE DRAWINGS

The present invention is illustrated by way of the accompanying drawings, in which.

DETAILED DESCRIPTION OF THE INVENTION

Figure 1A:
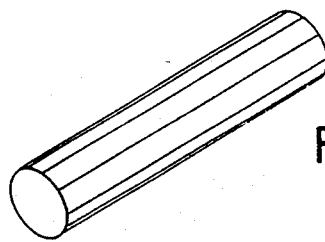
FIGS. 1(A)–1(D) show a series of perspective views (A)–(D) in several successive steps of a process for manufacturing a conventional brake pivot.
Figure 1B:
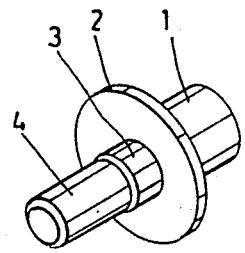
Figure 1C:
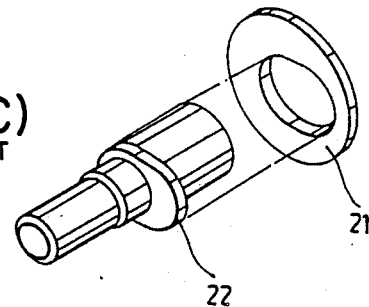
Figure 1D:
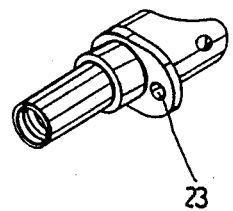
Figure 2:
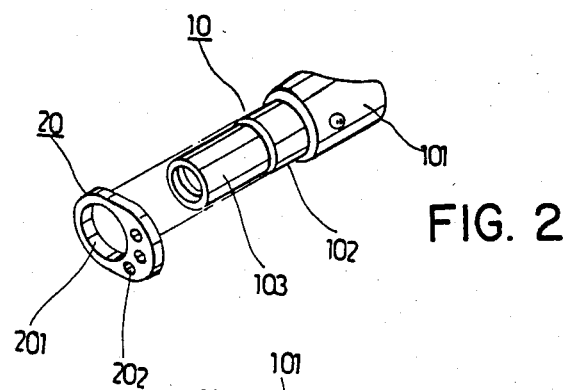
FIG. 2 is an exploded view of an embodiment according to the present invention.

Referring to FIG. 2, the pivot according to the present invention generally comprises a terraced pipe body 10 and a separately formed lob plate 20. Said terraced pipe body 10 is forged integrally from a metal rod, successively constituting a large end portion 101, a middle portion 102 and a small end portion 103. Said lobe plate 20 is substantially formed as an ellipse. There is a throughhole 201 opened near one end of the major axis of said ellipse and three eyes 202 opened near the other end of the same.

Figure 3:
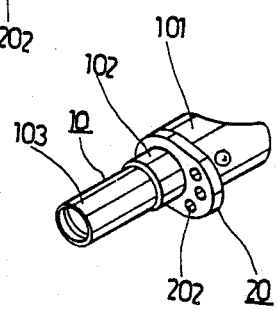
FIG. 3 is an assembled view of the embodiment illustrated in FIG. 2.
Figure 4:
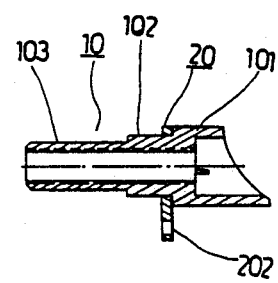
FIG. 4 is a sectional view of FIG.3.

Referring to FIGS. 3 and 4, said lobe plate 20 is tightly coupled on said middle portion 102 of said terraced pipe body 10 by means of said throughhole 201, and then stably welded thereto.

Figure 6:
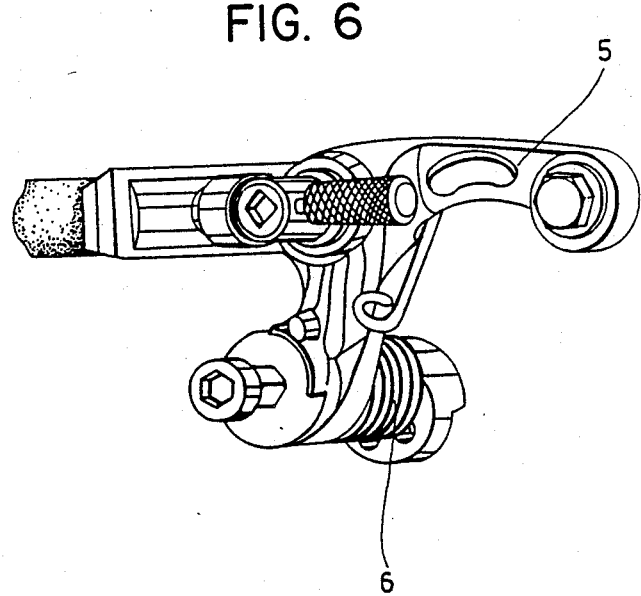
FIG. 6 is an exemplary view of a cantilever brake installed on a pivot according to the present invention.

Therefore, as shown in FIG. 6, a cantilever 5 can be rotatably supported on said small end portion 103, being resisted by a coil spring 6 which is disposed around said middle portion 102 while fixing one end thereof at an appropriate one of said three eyes 202 which are opened in said lobe plate 220 and extending the other end thereof to engage with said cantilever 5. Therefore, said cantilever 5 can be restorably rotated to depress a brake shoe (not shown) affixed at one end of said cantilever 5 to make contact with the rim (not shown) rotatably installed in a fork (not shown) of a bicycle, while a brake wire (not shown) which is connected with the other end of said cantilever is pulled to brake the bicycle.

Figure 5:
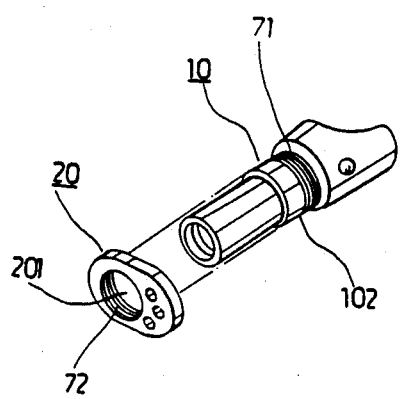
FIG. 5 is an exploded view of another embodiment according to the present invention.

FIG. 5 shows an exploded view of another embodiment according to the present invention. As shown in the figure, said lobe plate 20 can also be screwed onto said middle portion 102 of said terraced pipe body 10 by means of a pair of tightly fitted threads, said threads comprising an internal thread 72 formed in said throughhole 201 and an external thread 71 formed on said middle portion 102.

While the invention has been described in connection with what is presently considered to be the most practical and preferred embodiment, it is to be understood that the invention is not to be limited to the disclosed embodiment, but on the contrary, is intended to cover all the various modifications and equivalent arrangements included within the spirit and scope of the broadest interpretation.

I claim:

1. A pivot for a cantilever brake, usually affixed in a fork of a bicycle which combines a spring to pivotally and elastically support a cantilever, one end of which is connected with a brake wire and the other end of which supports a brake shoe, so that said cantilever can be restorably rotated to depress said brake shoe to make contact with a rim installed in said fork, while said brake wire is pulled to brake the bicycle, comprising:
   a terraced pipe body successively and integrally having a large end portion, a middle portion and a small end portion; and
   a separately formed lobe plate having a throughhole and at least one eye formed beside said throughhole, said one plate being tightly coupled on said middle portion of said terraced pipe body by means of said throughhole;
   whereby said cantilever can be rotatably supported on said small end portion while being resisted by said spring disposed around said middle portion, and one end thereof can be fixed at said eye of said loee plate and the other end thereof is extended to engage with said cantilever, wherein said lobe plate is formed as an ellipse having a major axis, said throughhole is formed near one end of said major axis, and said eye is formed near the other end of the same, and wherein said lobe plate is sleeved on said middle portion of said terraced pipe body and then welded thereto.

2. A pivot for a cantilever brake, usually affixed in a fork of a bicycle which combines a spring to pivotally and elastically support a cantilever, one end of which is connected with a brake wire and the other end of which supports a brake shoe, so that said cantilever can be restorably rotated to depress said brake shoe to make contact with a rim installed in said fork, while said brake wire is pulled to brake the bicycle, comprising:
   a terraced pipe body successively and integrally having a large end portion, a middle portion and a small end portion; and
   a separately formed lobe plate having a throughhole and at least one eye formed beside said throughhole, said one plate being tightly coupled on said middle portion of said terraced pipe body by means of said throughhole;
   whereby said cantilever can be rotatably supported on said small end portion while being resisted by said spring disposed around said middle portion, and one end thereof can be fixed at said eye of said lobe plate and the other end thereof is extended to engage with said cantilever, wherein said lobe plate is formed as an ellipse having a major axis, said throughhole is formed near one end of said major axis, and said eye is formed near the other end of the same, and wherein said lobe plate is screwed on said middle portion of said terraced pipe body by means of a pair of fitted threads comprising an external thread formed on said middle portion and an internal thread formed in said throughhole of said lobe plate.

* * * * *